United States Patent [19]
Seegmiller et al.

[11] 3,787,242
[45] Jan. 22, 1974

[54] ELECTROCHEMICAL CELL WITH ALUMINUM ELECTRODES AND DIFFERENT ELECTROLYTE CONCENTRATION IN TWO COMPARTMENTS

[76] Inventors: David W. Seegmiller, QTRS 4200A, USAF Academy; Lowell A. King, QTRS 4182, USAF Academy, both of Colo.

[22] Filed: Apr. 15, 1971

[21] Appl. No.: 134,281

[52] U.S. Cl. .............................................. 136/83 T
[51] Int. Cl. .............................................H01m 11/00
[58] Field of Search... 136/83, 6, 88, 153, 86 A, 20, 136/100 R

[56] References Cited
UNITED STATES PATENTS

| | | | |
|---|---|---|---|
| 3,413,151 | 11/1968 | Adams et al. ..................... | 136/83 R |
| 3,441,446 | 4/1969 | Heredy.......................... | 136/83 R X |
| 3,492,160 | 1/1970 | Silver....................................... | 136/6 |
| 3,573,105 | 3/1971 | Weininger et al. ................... | 136/86 |
| 3,632,448 | 1/1972 | Beltzer............................. | 136/86 A |

OTHER PUBLICATIONS

Evaluation of New Cathode–Anode Coupler for Secondary Batteries, T.D. Report No. ASD-TDR-62-4, April 1962, pp. 30.

*Primary Examiner*—Anthony Skapars
*Attorney, Agent, or Firm*—Harry A. Herbert, Jr.; William J. O'Brien

[57] ABSTRACT

An improved electrochemical cell of the thermal type is described. The improved cell comprises two interconnected compartments with separate aluminum electrodes and separate solid electrolytes positioned in each compartment. The solid electrolytic material positioned within each compartment consist essentially of a mixture of aluminum chloride and sodium chloride having proportions such that the gross stoichiometric composition of the electrolyte in one compartment is less than 50 mole percent aluminum chloride while the gross stoichiometric composition of the electrolyte in the other compartment is greater than 50 mole percent aluminum chloride. The difference in the relative concentrations of aluminum chloride in the two compartments provides an unexpected improvement in the operating characteristics of the improved cell of this invention.

1 Claim, 7 Drawing Figures

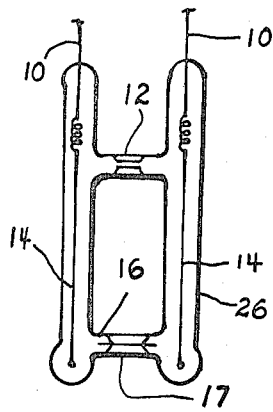
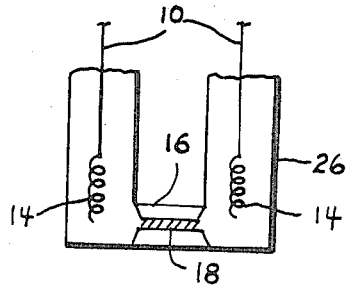
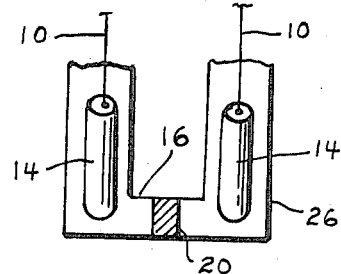
FIG.1  FIG.2  FIG.3
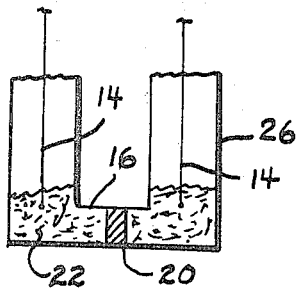
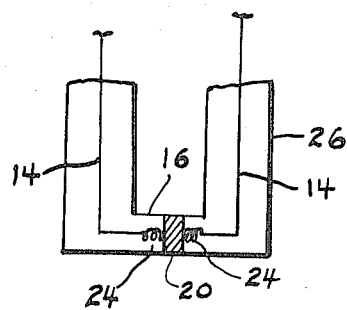
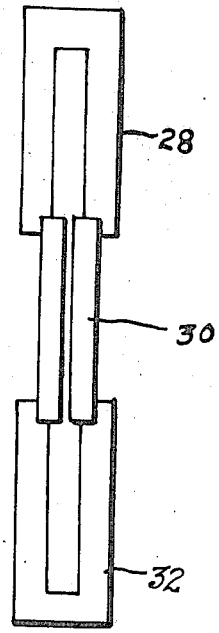
FIG.4  FIG.5  FIG.6
INVENTORS
DAVID W. SEEGMILLER
LOWELL A. KING
BY
Harry A. Herbert
William J. O'Brien
ATTORNEYS 3,787,242

ELECTROCHEMICAL CELL WITH ALUMINUM ELECTRODES AND DIFFERENT ELECTROLYTE CONCENTRATION IN TWO COMPARTMENTS

BACKGROUND OF THE INVENTION

This invention relates to an electrochemical cell of the thermal type. More particularly, this invention concerns itself with a thermal cell employing aluminum electrodes and a non-aqueous, fusible electrolyte.

The present interest in the operation of high altitude aircraft, missiles, and space vehicles, as well as in various military communication operations, has created a need for light weight, maintenance free, high energy density power supplies characterized by a long shelf-life. The use of light weight power supplies in weight sensitive space vehicles, the use of backpack batteries for downed pilots and infantrymen, as well as the use of field recharging units for smaller hand carried conventional secondary batteries are examples of the various applications that require a light weight power supply of the type encompassed within the scope of this invention.

A particularly attractive candidate for use as an electrode material in light weight power supplies is the metal aluminum. The metal is readily available, easily purified, inexpensive and capable of being fabricated into any reasonable shape. Consequently, a number of attempts have been made to utilize this metal as an electrode material. However, the problems of self discharge, aluminum passivation in acidic aqueous electrolytes, or aluminum corrosion in basic aqueous electrolytes have not been solved by prior art attempts at using aluminum as an electrode in concentration cells of the thermal type.

After numerous attempts, the problems encountered in using aluminum electrodes have been overcome by the invention of a thermal cell which comprises a container having two interconnected compartments; a fusible electrolyte comprising a mixture of 50–75 mole percent aluminum chloride and 50–25 mole percent sodium chloride contained in each compartment; and an aluminum electrode immersed in the electrolyte mixture contained in each compartment. Although the operation of the above cell has proved most successful, it has now been discovered that an unexpected improvement in that cell's operation is achieved when the mole concentration of aluminum chloride in the two compartments are on opposite sides of the 50 percent mark. By adhering to this requirement, the voltage produced during cell operation shows an improvement of 200 percent or greater.

SUMMARY OF THE INVENTION

In accordance with this invention, it has been found that an unexpected improvement in the operation of aluminum electrode containing power sources can be achieved by utilizing a solid electrolytic mixture of aluminum chloride and sodium chloride. The power source is a concentration type thermal cell comprising an interconnected two compartment container with an aluminum anode positioned in one compartment and an aluminum cathode positioned in the other compartment. The electrolytic mixture is a non-aqueous, fusible electrolyte comprising a mixture of about 40 to 75 mole percent aluminum chloride and about 60 to 25 mole percent sodium chloride and is contained in each compartment in contact with the anode and cathode.

The electrolyte composition in each compartment is similar in component content but differs in the relative concentration of aluminum chloride contained in each mixture. If each compartment contained the same relative concentration of electrolyte ingredients, then the resultant voltage of the cell would be zero. However, if the respective concentrations of aluminum chloride in each compartment is different than the cell is capable of generating electrical power. The magnitude of power or voltage produced by the cell is a direct correlation of the difference between the aluminum chloride concentrations in the electrolytes in each of the compartments. The greatest power production is achieved when the gross stoichiometric composition of the electrolyte mixture in one compartment is less than 50 mole percent aluminum chloride and the gross stoichiometric compositions of the electrolyte mixture in the other compartment is greater than 50 mole percent aluminum chloride with the balance in each compartment being sodium chloride.

At normal temperatures the electrolyte is solid and the cell remains inactive. Heating the cell, however, to a temperature within the range of about 125° to 250° C renders the electrolyte molten and activates the cell. The improved cell of this invention is capable of producing voltages in excess of 0.4 volts with energy densities nearly eight times greater than those available from conventional lead-acid and nickel-cadmium batteries.

Accordingly, the primary object of this invention is to provide an improved electrochemical power source of the thermal type.

Another object of this invention is to provide an improved high energy electrochemical cell that utilizes metallic aluminum electrodes in combination with a fusible electrolyte.

Still another object of this invention is to provide an improved high energy electrochemical cell that uilizes, as its fusible electrolyte, two separate mixtures of inorganic salts that differ only in the concentration of their respective ingredients.

A further object of this invention is to provide an improved high energy density thermal cell that is a low current, light-weight, long lasting, and economical power source particularly characterized by a lengthy, maintenance-free shelf-life.

Still a further object is to provide an improved high energy electrochemical cell that utilizes two separate mixtures of aluminum chloride and sodium chloride that differ in their concentration such that the aluminum chloride concentration is less than 50 mole percent in the first mixture and greater than 50 mole percent in the second mixure.

The above and still further objects and advantages of the present invention will become readily apparent upon consideration of the following detailed description thereof when taken in conjunction with the accompanying drawings. Like reference characters in the several views of the drawing indicate the same or similar elements.

DESCRIPTION OF DRAWINGS

In the Drawings:

FIGS. 1–6 represent a schematic illustration of two-compartmented concentration type electrochemical cells suitable for use in accordance with the teachings of this invention.

DESCRIPTION OF PREFERRED EMBODIMENT

Figure 7:
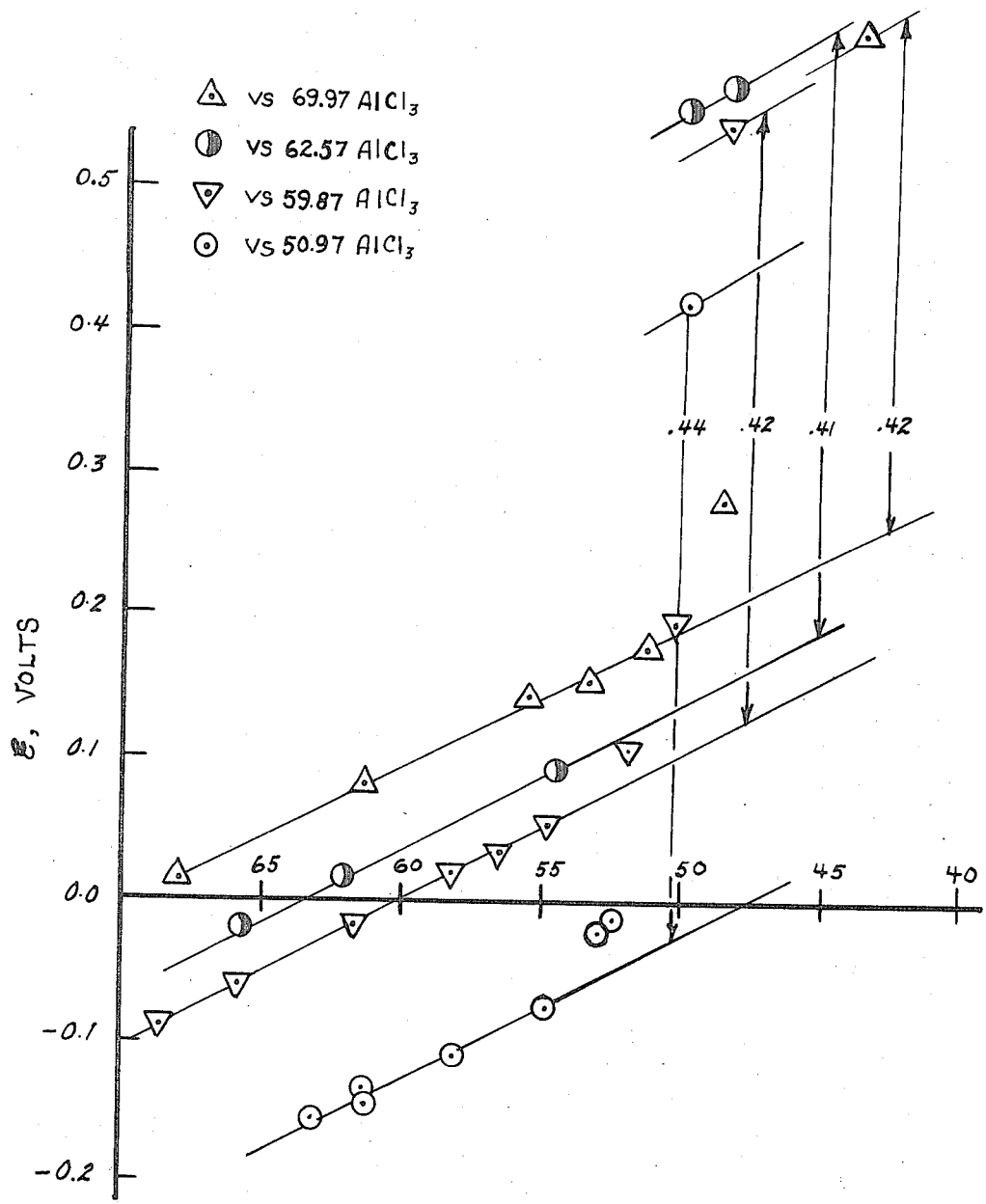
FIG. 7 represents a graphical illustration of the performance characteristics of the electrochemical cells of this invention.

The improved electrochemical cell of this invention comprises a two compartmented, interconnected container with two solid electrolytes of similar compositional content. The two electrolytes comprise the same ingredient mixture of aluminum chloride and sodium chloride, but differ in ingredient concentration. They are located in each of the compartments with an aluminum electrode immersed in each of the electrolytes. The cell is activated by heating the electrolytes to a temperature sufficient to convert the solid electrolytes to a molten state. The difference in the relative concentration of the electrolyte ingredients in each of the compartments determines the magnitude of the voltage generated by the cell. In this invention it has been found that cell voltages in excess of 0.4 volts can be obtained along with energy densities eight times greater than those available from conventional batteries when the molar concentration of aluminum chloride in the two compartments is on opposite sides of the 50 percent mark.

The solid electrolyte contained in each compartment of the cell of this invention comprises a mixture of about 40 to 75 mole percent aluminum chloride and 60 to 25 mole percent sodium chloride with the further stipulation that the gross stoichiometric composition of the electrolyte in one compartment is less than 50 mole percent aluminum chloride and that of the electrolyte in the other compartment is greater than 50 mole percent aluminum chloride with the balance, respectively, substantially all sodium chloride.

The following Table discloses examples of specific electrolyte compositions contemplated by the percent invention together with an indication of their cell characteristics:

TABLE I

| Example | Electrolyte Composition, Mole Percent | Volts Predicted from FIG.7 | Volts Observed | Internal Resistance, Ohms | Approximate Duration of Test |
|---|---|---|---|---|---|
| 1 | 49 vs 55 | 0.48 | 0.49 | 1450 | 14 days |
| 2 | 13.6 vs 59 | 0.55 | 0.56 | 103 | 24 days |
| 3 | 49 vs 55 | 0.48 | 0.47 | 10 | 5 days |
| 4 | 44 vs 59 | 0.55 | 0.46 | 19 | 18 days |
| 5 | 45 vs 59 | 0.50 | c.a.0.50 | 280 | 3 days |

The operating temperature for the cells listed in Table I was 190° which is approximately 35° above the minimum feasible operating temperature for the AlCl$_3$-NaCl system. The experiments represented by examples 1 through 5 were carried out using cell designs as exemplified in FIGS. 2, 3, 4, 5 and 6, respectively. The variety of cell designs was used to approximate various current, lifetime and internal resistance parameters.

Additional experiments were conducted to determine the effectiveness of the invention. In these experiments the initial electrolyte compositions in the right hand and left hand (LH) compartments were 62.5 mole percent and 70.1 mole percent aluminum chloride respectively. Sodium chloride was added to the left hand side in increments with the following results: (1) LH: 70.1 percent, E = −0.068V; LH: 65.8 percent, E = −0.025V; LH: 62.2 percent, E = 0.031V; LH: 54.6 percent, E = 0.090V; LH: 49.82 percent, E =0.555V; LH: 48.4 percent, E = 0.571V. The overall voltage increase over the 50 percent line was 0.445V. The increase calculated by extrapolating the lines to the 50 percent line was 0.41V.

The cell design of FIG. 1 was used in these experiments. The test results from these experiments are graphically shown in FIG. 7. The left hand sides of the four curves correspond to the type of cell relied upon in the past wherein the aluminum chloride concentration in each electrolyte of a cell was in excess of 50 mole percent. The unexpected improvement in voltage displayed on the right hand side of the graph are the results of making one electrolyte in each cell less than 50 mole percent in aluminum chloride.

The highest voltages obtained with prior art aluminum electrode cells of the same general type contemplated by this invention was 0.23V. The modification of this invention adds an increment of 0.41V to what otherwise would have been the voltage of a concentration cell with one arm just above the 50 mole percent line.

These voltages may be translated into theoretical energy densities by the equation:

$$\text{Energy density} = n\mathcal{F}E/(\text{mass of one mole of reactant transferred to product})$$

where n = number of equivalents per mole = 3
$\mathcal{F}$ = the Faraday constant
$E$ = the cell voltage Some theoretical energy densities are shown in Table II

TABLE II

| Cell | Energy Density, Watt-Hours/Pound |
|---|---|
| Nickel-Cadmium (Conventional Cell) | 107 |
| Lead-Acid (Conventional Cell) | 112 |
| Aluminum Concentration Cell (of the prior art) | 315 |
| Aluminum Concentration Cell (of this invention) | 820 |

A cell similar to the one pictured in FIG. 1 was operated continuously for a period greater than 1 year. Initial aluminum chloride concentrations were 45 percent and 55 percent. The initial voltage it exhibited was 0.45V at 170° C. Due to gradual mixing of the electrolytes, the voltage dropped in the course of the year to 0.24V, which is still one hundred-fold times greater than expected from a calculation based on overall stoichiometric (unmixed) electrolyte compositions.

The solid electrolytes contemplated by the invention are rendered molten at temperatures ranging from about 125° C to 250° C. A 60-40 ratio of $AlCl_3$ to NaCl melts at the lower temperature. Heating the cell to the appropriate temperature converts it from an inactive state to an active state with the resulting generation of electrical power. Any suitable heating means may be employed for activating the cell.

Both the anode and cathode of the cell of this invention are fabricated from metallic aluminum. Each is separately positioned within one of the two compartments containing the electrolyte mixtures. The two compartments are interconnected such that the two electrolyte mixtures come in physical contact. Generally, a porous or wick-like material, such as asbestos fiber, pyrex glass wool or pyrex frit is placed within the interconnecting passageway to form a porous bridge between the two electrolyte mixtures. This provides sufficient physical contact while simultaneously preventing any undue mixing of the two electrolyte mixture concentrations.

In the application of the cells of this invention to a specific battery construction, any well known conventional design configuration maybe employed. As previously noted, the construction requires only a two-compartmented container for holding the two electrolyte mixtures with a means connecting the two compartments to provide adequate physical contact between the electrolytes.

For the purpose of illustrating a typically constructed cell of the invention, reference is made to the accompanying drawings. In the drawings, FIGS. 1 through 5 show chemical cells each comprising a container 26 having two separate compartments. A passageway 16 connected the two compartments for the purpose of providing physical contact between a first $AlCl_3$-NaCl electrolyte mixture and a second $AlCl_3$-NaCl electrolyte mixture each contained within one of the compartments. Aluminum electrodes 14 are immersed in their respective electrolyte mixtures and function as the anode and cathode components of the cell. The electrodes, in some cells, are connected to a suitable tungsten or platinum leads 10. The leads 10, in turn, are connected to external loads, not shown, which consume the electrical power generated by the cells. A pressure equalizing capillary 12 interconnects the top portions of the two compartments in the cell of FIG. 1. The passageway 16 contains a suitable porous or wick like fibrous material such as asbestos fibers 17, pyrex glass wood 18, fine pyrex frit 20. The porous material is used to prevent mixing between the two electrolyte mixtures. Elements 22 and 24 represent fine granular aluminum and coiled aluminum respectively in order to provide an improved electrical contact.

The cell of FIG. 6 represents still another design and comprises, a unitary aluminum electrode and electrolyte compartment combination at 28 and another at 32. A teflon capillary passageway 30 connects the two combination compartments 28 and 32.

The container 26 can be made of pyrex glass or some other suitably inert material. The cell is provided with suitable heating means, not shown, for activating the cell. For example, electric coils may be used or the cell could be coated with a paste of water, filler material and a pyrotechnic agent. A mixture of zirconium and barium chromate could serve as the pyrotechnic agent. The paste would be applied wet to the surface of the cell and allowed to dry. An electric match, connected to a source of electric power, would be embedded in the pyrotechnic paste and activated by closing a suitable switching arrangement. The match would ignite the pyrotechnic material which, in turn, would generate sufficient heat to fuse the two electrolytic salt mixtures thereby activating the battery.

In the testing and operation of the cell of Fig. 1, it was found that the capillary 12 eliminated any detectable mass transport of melt through the asbestos fiber 17. The electrodes 14 were made from "Baker Analyzed" reagent grade 0.032 inch diameter aluminum wire. During the cell testing experiments referred to herein, the melt in each compartment or arm of a cell was stirred with a Teflon-covered magnetic stirring bar. The cells were immersed in a conventional, well-stirred, constant temperature, silicone oil both in order to provide adequate operating temperatures. Melt concentration ratios were changed by adding known weights of either $AlCl_3$ or NaCl to one of the arms of the cell. A new, steady cell voltage was reached once the added salt was dissolved and well mixed.

Only purified salt mixtures were utilized for the electrolyte compositions. The purification of aluminum chloride was accomplished by repetitive sublimation of "Baker Analyzed" reagent grade $AlCl_3$ in dry argon along the length of a 60 cm long, 5.4 cm O.D. Pyrex tube and finally into a receptacle which was capped with a standard taper plug. "Baker Analyzed" reagent grade sodium chloride was dried by fusion in air. The two chlorides were stored, handled and mixed in a glove box filled with dry air. Electrolyte compositions were fixed by weight. Water-clear, colorless, molten mixtures were obtained after being subjected to the appropriate operating temperatures. The resulting cell voltages were measured with a Leeds and Northrup K-3 potentiometer and a Leeds and Northrup Electronic D.C Null Detector.

While the prinicple of this invention has been described with particularity, it should be understood that various alterations and modifications can be made without departing from the spirit of the invention, the scope of which is defined by the appended claims.

What is claimed is:

1. An electrochemical cell comprising two interconnected compartments, an aluminum electrode positioned in each of said compartments, a fusible, non-aqueous electrolyte in each of said compartments, said electrolyte in one of said compartments consisting essentially of a mixture of 45.0 mole percent aluminum chloride with the balance sodium chloride and the electrolyte in the other said compartment consisting essentially of a mixture of 55.0 mole percent aluminum chloride with the balance sodium chloride.

* * * * *